United States Patent [19]

Stappaerts

[11] 4,268,801
[45] May 19, 1981

[54] MODE-LOCKED LASER USING A SATURABLE ABSORBER IN A CAVITY

[75] Inventor: Eddy A. Stappaerts, Redondo Beach, Calif.

[73] Assignee: Northrop Corporation, Los Angeles, Calif.

[21] Appl. No.: 58,149

[22] Filed: Jul. 17, 1979

[51] Int. Cl.³ .............................................. H01S 3/098
[52] U.S. Cl. ........................ 331/94.5 ML; 331/94.5 C
[58] Field of Search ...................... 331/94.5 C, 94.5 L, 331/94.5 M, 94.5 ML

[56] References Cited

U.S. PATENT DOCUMENTS 3,496,487  2/1970  Soffer et al. .................. 331/94.5 C
3,575,670  4/1971  Hansen ......................... 331/94.5 C Primary Examiner—William L. Sikes
Assistant Examiner—Léon Scott, Jr.
Attorney, Agent, or Firm—Edward A. Sokolski

[57] ABSTRACT

A laser which utilizes a saturable absorber within a second resonator to obtain mode-locking for the production of short pulses. A second resonator which contains the saturable absorber and operates at the lasing frequency of the absorber intensifies the radiation from the absorber. The intensified radiation interacts with the absorber to reduce its effective lifetime and thus shorten its recovery time following saturation. The reduced lifetime absorber interacts with a laser amplifier to mode-lock the amplifier, thus producing short pulses of laser energy.

1 Claim, 1 Drawing Figure

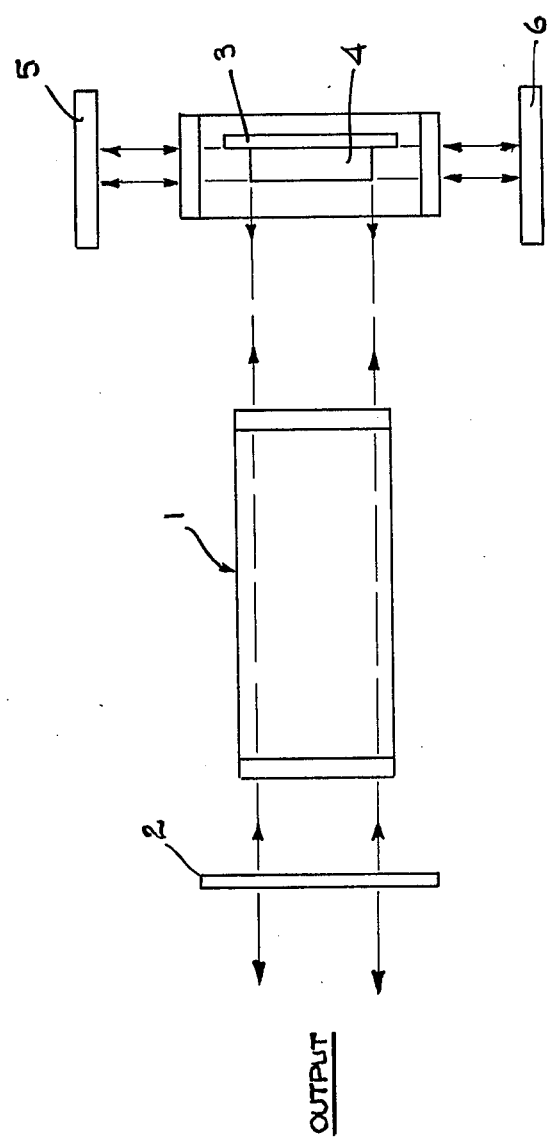

MODE-LOCKED LASER USING A SATURABLE ABSORBER IN A CAVITY

BACKGROUND OF THE INVENTION

1. Field of the Invention

This invention pertains to methods and devices for the generation of very short pulses by lasers. More particularly, this invention pertains to the use of saturable absorbers for mode locking of lasers for the purpose of producing short pulses.

2. Description of the Prior Art

Short pulses which are produced by mode-locked lasers have many applications in biological studies, semiconductor studies, etc. In addition, if pulses could be produced of less than a picosecond in length and with an energy level in excess of 1 joule, it might be useful as a pump for a coherent, X-ray laser. (All X-ray sources to date are incoherent.) The generation of such pulses also would be useful for the holographic study of molecules.

Saturable dyes have been used extensively in the prior art to mode-lock lasers for the production of short pulses. Erich P. Ippen and Charles V. Shank have described the use of saturable dyes, for producing short pulses, in "Sub-Picosecond Spectroscopy", *Physics Today*, May, 1978, pp. 41–47, and have described the use of the dyes for mode-locking in "Mode-Locking of Dye Lasers" in *Dye Lasers*, edited by F. P. Schafer, Springer Verlag, New York, 1973.

In order to mode-lock lasers which contain a gain medium with a relatively short lifetime, a saturable absorber with a lifetime much shorter than the cavity round-trip time normally is required. Excellent results have been obtained when a dye like DODCI, which has a lifetime of a few hundred picoseconds, has been used to mode-lock RH6G (Rhodamine 6G), which has a lifetime of approximately 5 nanoseconds.

Unfortunately, in some wavelength ranges, and especially in the ultraviolet, saturable absorbers with such short lifetimes are not yet known, although absorbers with lifetimes on the order of several nanoseconds are easily available.

An object of this invention is to provide a mode-locking device which uses absorbers with lifetimes of several nanoseconds within a second resonator, whereby the "effective" lifetime of the absorber is reduced to the desired values of several hundred picoseconds.

SUMMARY OF THE INVENTION

This invention utilizes a second resonator to reduce the effective lifetime of a saturable absorber located in a second resonator. The saturable absorber, in turn, mode-locks an amplifier located in a first resonator so as to produce very short pulses. The second resonator operates at the lasing frequency of the saturable absorber so as to intensify the electromagnetic fields emitted by the saturable absorber. The intensified fields interact with the saturable absorber by means of stimulated radiation to effectively reduce its natural radiation lifetime by more than one order of magnitude and correspondingly shorten its recovery time from saturation. Because the recovery time of the saturable absorber is reduced, the saturable absorber can be used to mode-lock the laser amplifier in wavelength ranges for which saturable absorbers with natural lifetimes sufficiently short to obtain mode-locking are not presently known.

BRIEF DESCRIPTION OF THE DRAWINGS

FIG. 1 is a schematic diagram of the device of the invention.

DESCRIPTION OF THE PREFERRED EMBODIMENT

Laser amplifier 1 is located between mirrors 2 and 3 which mirrors define a resonator operating at the wavelength of the emissions from amplifier 1. Mirror 2 is only partially reflective and allows approximately 15% of the incident waves to pass through it to produce the output from the device. The remainder of the wave incident on mirror 2 is reflected back into amplifier 1. Mirror 3 reflects substantially all of the energy incident thereon.

A saturable absorber 4 is located within the resonator formed by mirrors 2 and 3. Although the saturable absorber 4 could be located at any of a number of points within said resonator, in the best mode of the invention, it is placed adjacent to mirror 3 so as to enhance the mode-locking process. Part of the energy emitted by the amplifier and incident upon the saturable absorber 4 is absorbed by the absorber and then reradiated by the absorber at the lasing wavelength of the absorber. Mirrors 5 and 6 form a second resonator which operates at the lasing frequency of the saturable absorber to intensify the radiation emitted by the saturable absorber. The intensified fields interact with the saturable absorber 4 to reduce the effective liftime of the saturable absorber 4 by an order of magnitude or more.

Mode-locking by means of a saturable absorber for the purpose of producing short pulses has been described in U.S. Pat. No. 3,904,984. The present invention provides a means for utilizing relatively slow saturable absorbers which would not lead to mode-locking in the absence of the second resonator formed by mirrors 5 and 6. Although the second resonator formed by mirrors 5 and 6, as shown in FIG. 1, is oriented at right angles or transverse to the resonator formed by mirrors 2 and 3, the operation of the invention is not dependent upon this relative orientation. For instance, the two resonators could be colinear if mirrors 3 and 5 were combined as one and mirror 6 was placed between mirrors 2 and 3 and was reflective at the lasing frequency of the saturable absorber and while being fully transmissive at the wavelength emitted by amplifier 1.

In an operative embodiment of the invention, the amplifier 1 is a Phase-R Corporation Model DL-1100 dye laser. The resonator formed by mirrors 2 and 3 is 75 centimeters in length and mirror 2 has a reflectivity of 85%. The amplifier utilizes rhodamine 6G and the saturable absorber is cresyl violet. The cresyl violet absorber dye is placed in contact with totally reflecting mirror 3. Mirrors 5 and 6 are nearly totally reflective. In this configuration, the lasing wavelength of rhodamine 6G is 590 nm. In the absence of the second resonator, the amplifier produces pulses several nanoseconds or greater in length. However, with the second resonator in place, the amplifier produces pulses less than 100 picoseconds in length and potentially as short as approximately 1 picosecond.

I claim:

1. A mode-locked laser for generating short pulses of optical energy comprising:

(a) a laser operating at a first optical frequency and having an amplifier and a first optical resonator which first optical resonator occupies a first spatial volume, (b) a second optical resonator which occupies a second spatial volume, (c) said first and second spatial volumes consisting, at least in part, of a common spatial volume that is common to both the first and second spatial volumes, (d) a saturable absorber located within the common spatial volume so as to absorb electromagnetic energy at the first optical frequency, emit electromagnetic energy into the second optical resonator by lasing action at a second optical frequency, and be acted upon by the electromagnetic fields in the second optical resonator so as to effectively reduce the recovery time of the saturable absorber, thus allowing the saturable absorber to mode-lock the laser at a range of wavelength where proper mode-locking is not feasible using the saturable absorber in the absence of the second optical resonator, (e) said second optical resonator being resonant at the second optical frequency at which the saturable absorber emits electromagnetic energy by lasing action.

* * * * *